United States Patent
Firkser et al.

(10) Patent No.: US 10,072,715 B2
(45) Date of Patent: Sep. 11, 2018

(54) TURBINE WITH YAW BRAKE MECHANISM HAVING A ROTOR LOCK AND A CORRESPONDING RECEPTACLE

(71) Applicant: LOCKHEED MARTIN CORPORATION, Bethesda, MD (US)

(72) Inventors: Stephen Firkser, Cherry Hill, NJ (US); Thomas E. McGuigan, Neptune City, NJ (US)

(73) Assignee: Lockheed Martin Corporation, Bethesda, MD (US)

( * ) Notice: Subject to any disclaimer, the term of this patent is extended or adjusted under 35 U.S.C. 154(b) by 616 days.

(21) Appl. No.: 14/629,653

(22) Filed: Feb. 24, 2015

(65) Prior Publication Data

US 2016/0245258 A1    Aug. 25, 2016

(51) Int. Cl.
  *F03D 11/00*   (2006.01)
  *F16D 63/00*   (2006.01)
  *F03D 7/02*    (2006.01)
  *F03D 80/70*   (2016.01)

(52) U.S. Cl.
  CPC ......... *F16D 63/006* (2013.01); *F03D 7/0212* (2013.01); *F03D 80/70* (2016.05); *F05B 2270/329* (2013.01); *Y02E 10/723* (2013.01)

(58) Field of Classification Search
  CPC .............................. F03D 7/0212; F03D 80/50
  See application file for complete search history.

(56) References Cited

U.S. PATENT DOCUMENTS

| | | | |
|---|---|---|---|
| 8,334,608 | B2 | 12/2012 | Pechlivanoglou et al. |
| 8,769,815 | B2 | 7/2014 | Shiraishi et al. |
| 2011/0109096 | A1 | 5/2011 | Earley |
| 2011/0132119 | A1 | 6/2011 | Flamm |

(Continued)

FOREIGN PATENT DOCUMENTS

| CN | 103161686 | 6/2013 |
|---|---|---|
| CN | 103184973 | 7/2013 |

(Continued)

OTHER PUBLICATIONS

International Search Report and Written Opinion for International Patent Application No. PCT/US2016/014697, dated Apr. 25, 2016, 13 pages.

(Continued)

*Primary Examiner* — Dwayne J White
*Assistant Examiner* — Kayla McCaffrey
(74) *Attorney, Agent, or Firm* — Withrow & Terranova, PLLC

(57) ABSTRACT

A yaw brake mechanism is described for maintaining a yawing structure, such as a nacelle of a fluid turbine, at a desired orientation or azimuthal heading about a reference or yaw axis. The yaw brake mechanism uses one or more rotor locks and one or more receptacles that cooperate with one another to achieve the locking function. One of the rotor locks is actuatable so that a portion thereof can be engaged in one of the receptacles to lock the yawing structure. The number of rotor locks and receptacles can be selected to allow the yawing structure to achieve any azimuth heading around the full 360 degrees of the yaw axis with various degrees of accuracy. The yaw brake mechanism allows the yawing structure to maintain multiple headings while being subjected to extreme moment and force loads in a low mass, low height, low cost solution.

21 Claims, 7 Drawing Sheets

(56) References Cited

U.S. PATENT DOCUMENTS

| | | |
|---|---|---|
| 2011/0299975 A1 | 12/2011 | Pechlivanoglou |
| 2011/0299998 A1 | 12/2011 | Yoshida |
| 2012/0266708 A1 | 10/2012 | Valero Lafuente |
| 2013/0170989 A1 | 7/2013 | Trede et al. |
| 2014/0041474 A1 | 2/2014 | Close et al. |
| 2014/0133983 A1 | 5/2014 | Canedo Pardo |
| 2014/0331797 A1 | 11/2014 | Rasmusen et al. |

FOREIGN PATENT DOCUMENTS

| | | |
|---|---|---|
| KR | 101105415 | 1/2012 |
| WO | 2013032136 | 3/2013 |

OTHER PUBLICATIONS

International Preliminary Report on Patentability for International Patent Application No. PCT/US2016/014697, dated Sep. 8, 2017, 10 pages.

TURBINE WITH YAW BRAKE MECHANISM HAVING A ROTOR LOCK AND A CORRESPONDING RECEPTACLE

FIELD

This technical disclosure relates to a yawing structure and a yaw brake mechanism for maintaining the yawing structure at a desired azimuthal heading.

BACKGROUND

Yawing structures, including certain fluid turbines, may require the ability to achieve different azimuth headings throughout their deployment. For example, in the case of certain fluid turbines such as tidal turbines, water turbines, or wind turbines, the fluid flow heading is often variable, and the rotor of the turbine needs to be oriented in the proper orientation relative to the flow of the fluid in order for the fluid turbine to efficiently harness power to maximize power production.

Existing solutions that are currently employed as yaw brake mechanisms include disc brakes and motor brakes. Utilization of disc brakes as a yaw braking mechanism follows the same principle as a car's disc brake system, but on a much larger scale. Utilizing disc brakes requires a large number of disc brakes to accommodate the high torque. This results in a heavy, tall, and costly braking mechanism.

Motor brakes employ a low torque brake within the yaw drive powertrain system. The brake's low torque is multiplied by the use of a high gear ratio gearbox to create a large torque at the pinion to slew bearing interface. Using multiple powertrains further increases the braking torque available at the slew bearing.

In addition, it is known to use a single rotor lock mechanism between the rotor hub and nacelle interface of a wind turbine for hub lock out (i.e. prevent rotation of the rotor hub relative to the nacelle) during maintenance.

SUMMARY

A yaw brake mechanism is described for maintaining a yawing structure at a desired orientation or azimuthal heading about a reference axis. In one embodiment, the yaw brake mechanism allows the yawing structure to achieve and subsequently maintain multiple headings while being subjected to extreme moment and force loads in a low mass, low height, low cost solution.

As used herein, the term yawing structure refers to any structure where the orientation of the structure relative to a reference axis can be selectively altered and where the yawing structure can be held or locked at a particular orientation relative to the reference axis.

In one non-limiting example, a yawing structure can be a structure that is rotatable about a yaw axis, which can be a vertical or near vertical axis, and locked in a particular orientation about the yaw axis.

Examples of yawing structures that are intended to be encompassed within this disclosure include, but are not limited to, nacelles of tidal turbines, water turbines or wind turbines. The nacelle is rotatable about a yaw axis relative to a tower on which the nacelle is rotatably supported. The nacelle rotatably supports a rotor that in use is driven by a fluid, such as water or air, flowing past the rotor in order to generate electrical energy and/or produce mechanical energy from the rotation of the rotor. A yaw drive mechanism is included that is used to selectively cause rotation of the nacelle to a desired orientation or azimuthal heading about the yaw axis. In addition, a yaw brake mechanism is provided that is selectively actuatable to lock the nacelle at the desired orientation. In one described embodiment, the yaw brake mechanism provides a means of achieving and subsequently maintaining multiple azimuth headings.

In one embodiment, the yaw brake mechanism has at least one rotor lock and at least one receptacle that can cooperate with one another to achieve the locking function. In another embodiment described herein, the yaw brake mechanism has a plurality of rotor locks and a plurality of receptacles that can cooperate with one another to achieve the locking function. When multiple rotor locks and receptacles are used, one of the rotor locks is actuatable to an engaged condition so that a portion thereof is engaged in one of the receptacles to lock the yawing structure. In one embodiment, a single rotor lock is capable of countering the full torque of the yawing structure. In other embodiments, more than one rotor lock can be simultaneously engaged with the receptacles. In one non-limiting example, the number of rotor locks and receptacles can be selected to allow the yawing structure to achieve any azimuth heading around the full 360 degrees of rotation with less than about ±1.0 degree accuracy. In another non-limiting example, eight rotor locks and twenty-five receptacles can be used.

In one example, a yaw brake mechanism of a yawing structure that is rotatably mounted on a non-rotatable structure and that is rotatable about a yaw axis of the non-rotatable structure can include at least one rotor lock that is actuatable between an engaged condition and a disengaged condition. A lock plate can cooperate with the at least one rotor lock for fixing the yawing structure in a desired orientation about the yaw axis. The lock plate can include at least one receptacle that can receive a portion of the at least one rotor lock therein when the at least one rotor lock is actuated to the engaged condition. The lock plate and the at least one rotor lock are positioned relative to each other whereby the portion of the at least one rotor lock is disposed within the at least one receptacle of the lock plate when the at least one rotor lock is actuated to the engaged condition thereby preventing rotation of the yawing structure about the yaw axis, and the portion of the at least one rotor lock is removed from the at least one receptacle of the lock plate when the at least one rotor lock is actuated to the disengaged condition thereby permitting rotation of the yawing structure about the yaw axis.

In another example, a fluid turbine described herein can include a tower having a yaw axis, a nacelle rotatably mounted on the tower and rotatable about the yaw axis to change an orientation of the nacelle about the yaw axis, a yaw drive mechanism for rotating the nacelle about the yaw axis, a rotor rotatably mounted on the nacelle for rotation about a rotation axis, and a yaw brake mechanism for fixing the orientation of the nacelle about the yaw axis. The yaw brake mechanism can include at least one rotor lock mounted to either the nacelle or the tower that is actuatable between an engaged condition and a disengaged condition. A lock plate is provided that cooperates with the at least one rotor lock for fixing the nacelle in a desired orientation about the yaw axis, the lock plate mounted to either the tower or the nacelle. The lock plate includes at least one receptacle that can receive a portion of the at least one rotor lock therein when the at least one rotor lock is actuated to the engaged condition. In addition, the lock plate and the at least one rotor lock are positioned relative to each other whereby the portion of the at least one rotor lock is disposed within the at least one receptacle of the lock plate when the at least one rotor lock is actuated to the engaged condition thereby preventing rotation of the nacelle about the yaw axis and the portion of the at least one rotor lock is removed from the at least one receptacle of the lock plate when the at least one rotor lock is actuated to the disengaged condition thereby permitting rotation of the nacelle about the yaw axis.

DRAWINGS

DETAILED DESCRIPTION

A yaw brake mechanism, which can also be referred to as a yaw holding brake, is described for maintaining a yawing structure at a desired orientation or azimuthal heading about a reference axis. A yawing structure can be any structure where the orientation of the structure relative to the reference axis can be selectively altered and where one wishes to hold or lock the yawing structure at a particular orientation relative to the reference axis.

For sake of convenience, the yawing structure will be described below as, and is illustrated herein as, a fluid driven turbine, in particular a nacelle of the fluid driven turbine. The fluid driven turbine can include, but is not limited to, a tidal turbine, a water turbine, or a wind turbine. The nacelle is rotatable about a yaw axis which, for sake of convenience, will be described as being a vertical or near vertical axis. However, the yaw brake concepts described herein can be applied to other yawing structures that are rotatable about yaw axes that are not vertical or near vertical.

Figure 1:
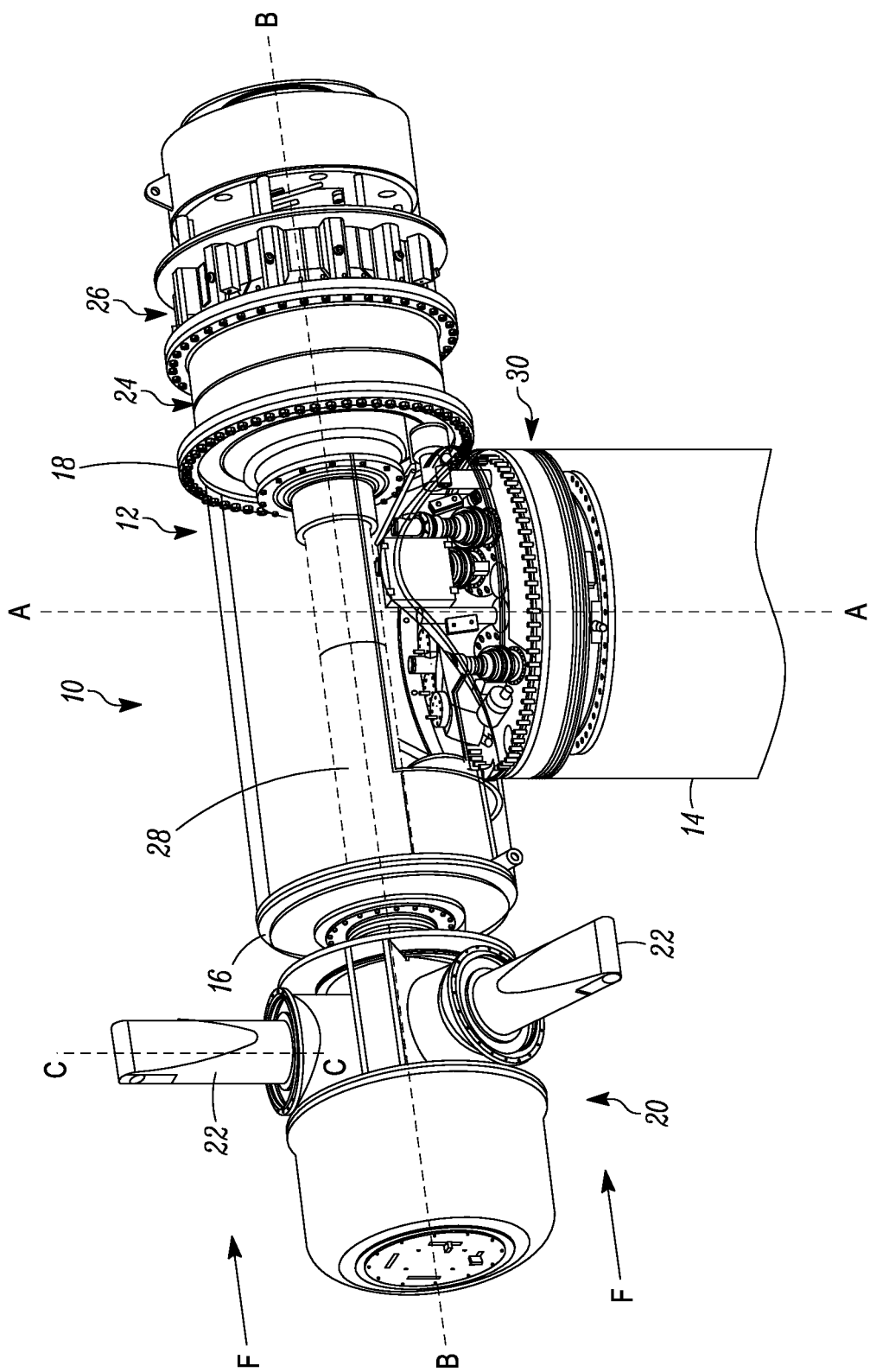
FIG. 1 is a perspective side view of a portion of a turbine that utilizes the yaw brake mechanism described herein, with portions of the turbine removed or made transparent in order to illustrate the concepts of the yaw brake mechanism.

With reference to FIG. 1, a portion of a fluid driven turbine 10 is illustrated. The turbine 10 includes a nacelle 12 which is rotatably mounted at an upper end of a tower 14, via a yaw drive mechanism 30 described below, for rotation relative to the tower 14 about a yaw axis A-A. In FIG. 1, the nacelle 12, which may also be referred to as a housing, is illustrated as being transparent in order to allow the interior components within the nacelle 12 to be viewed. In the actual turbine 10, the nacelle 12 would not be transparent. The tower 14 can be fixedly mounted in any manner so that it does not rotate. For example, the tower 14 can be mounted directly or indirectly in or on the ground in the case of a wind turbine; the tower 14 can be mounted directly or indirectly in or on a sea floor or the bottom of another body of water in the case of a water or tidal turbine.

In one embodiment, the yaw axis A-A can extend substantially vertically. In other embodiments, the yaw axis A-A can be inclined at an angle to vertical. The yaw axis A-A can be inclined at any angle to vertical. For example, in one non-limiting embodiment, the yaw axis can be inclined ±4 degrees from vertical.

The nacelle 12 includes a first end 16, which can be a forward or front end, and a second end 18, which can be a back or rear end. A rotor 20 is rotatably mounted at the first end 16 for rotation about a rotation axis B-B. In one embodiment, the rotation axis B-B can extend substantially horizontally. In other embodiments, the rotation axis B-B can be inclined at an angle to horizontal.

In the illustrated example, the rotor 20 includes a plurality of blades (not shown) that are detachably mounted to blade mounts 22 that extend generally radially from the rotor 20. In the illustrated example, there are three blade mounts 22 and therefore three blades. However, a larger or smaller number of blade mounts and blades can be used. The blade mounts 22 and the blades mounted thereto can be fixed pitch, or the blade mounts 22 and the blades fixed thereto can be mounted so as to permit pitch variation by rotating about an axis C-C of the blade mounts 22 and blades. In the case of variable pitch blades, a pitch change mechanism (not shown in detail) can be provided within the rotor 20. As would be well understood by a person of ordinary skill in the art, the rotor 20 is designed to be rotated about the rotation axis B-B as a result of a fluid, such as water or air, flowing past the blades thereof as illustrated by the arrows F in FIG. 1.

With continued reference to FIG. 1, a gearbox 24 and a generator 26 are mounted at the second end 18. A shaft 28 that extends through the nacelle 12 connects the rotor 20 to the gearbox 24 so that rotation of the rotor 20 is transferred to the gearbox 24 which in turn results in electricity generation in the generator 26. The detailed construction and operation of the rotor 20, the gearbox 24 and the generator 26 are well known to those of ordinary skill in the art and are not further described herein.

Between the nacelle 12 and the tower 14, the yaw drive mechanism 30 is provided that is configured to rotate the nacelle 12 about the yaw axis A-A relative to the tower 14. The yaw drive mechanism 30 changes the azimuthal heading or orientation of the nacelle 12 and the rotor 20 mounted thereon about the yaw axis A-A in order to orient the rotor 20 at the optimal heading relative to the fluid flow F which can change direction. The yaw drive mechanism 30 can have any construction that is suitable for achieving rotation of the nacelle 12 about the yaw axis A-A. The specific construction and operation of yaw drive mechanisms is well known in the art.

Figure 2:
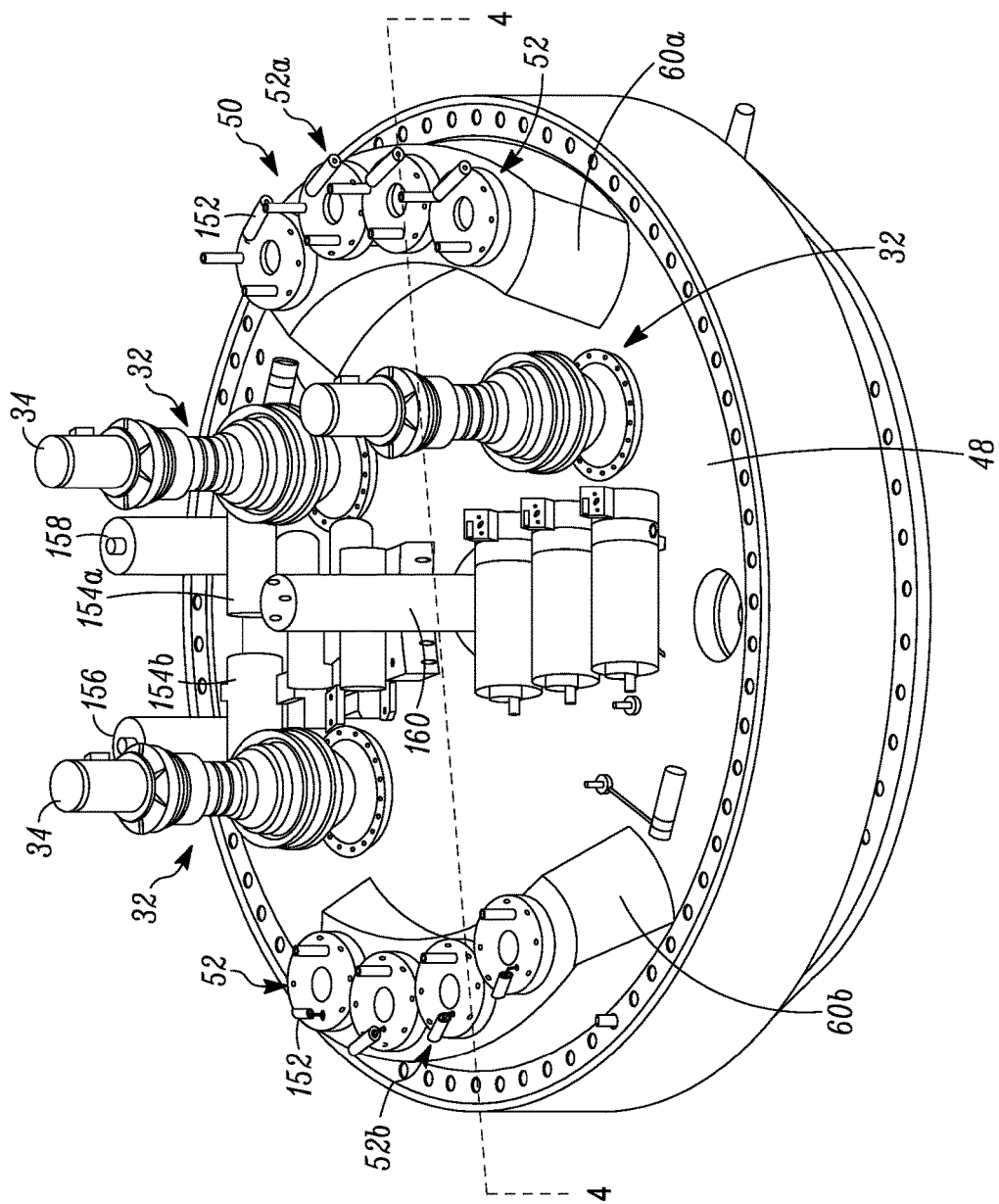
FIG. 2 is an upper perspective view of a yaw drive mechanism together with the yaw brake mechanism contained in a region between the nacelle and the tower of the turbine of FIG. 1.
Figure 3:
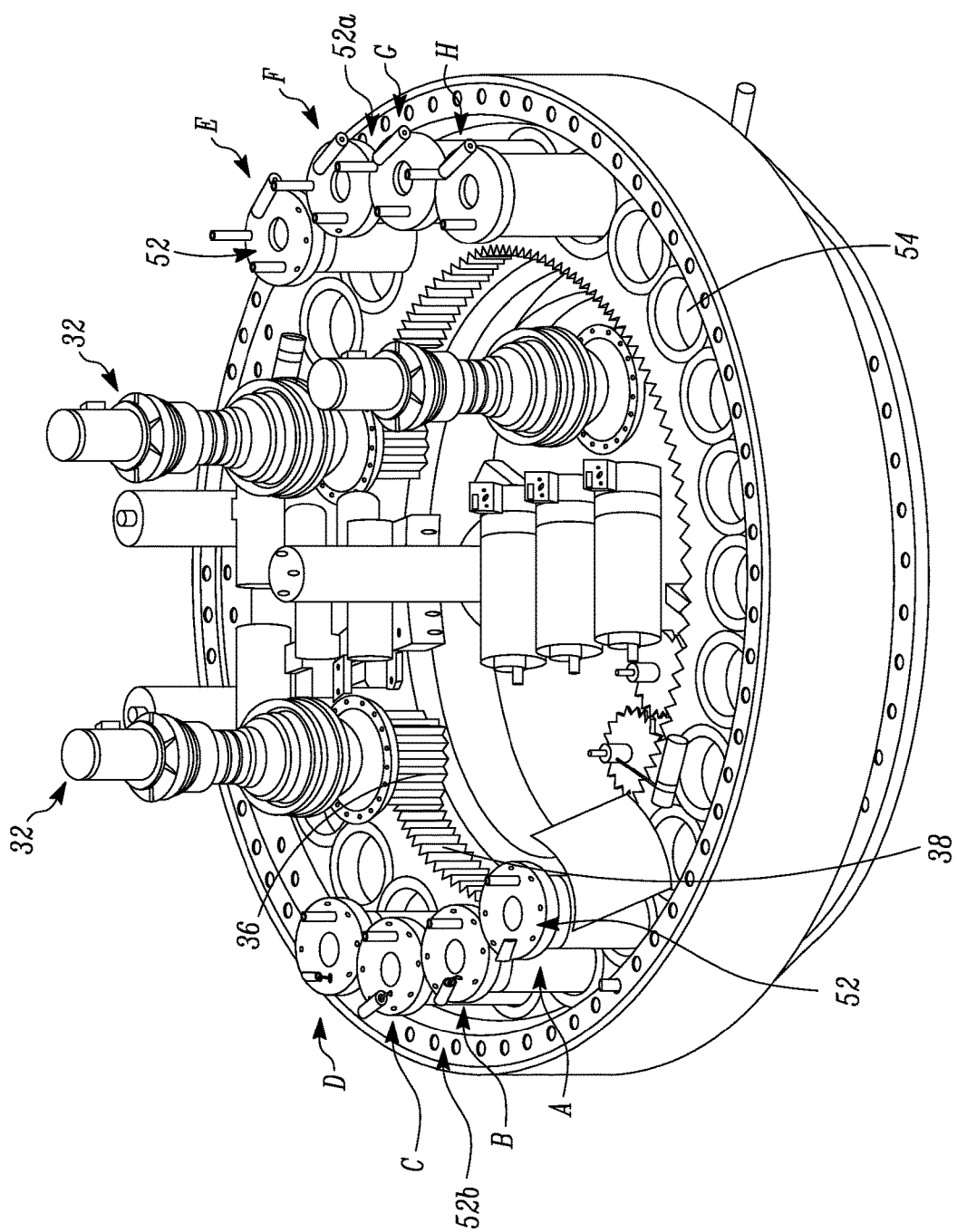
FIG. 3 is a view similar to FIG. 2 with a rotating plate of the yaw drive mechanism removed to better illustrate the components of the yaw drive mechanism and the yaw brake mechanism.
Figure 4:
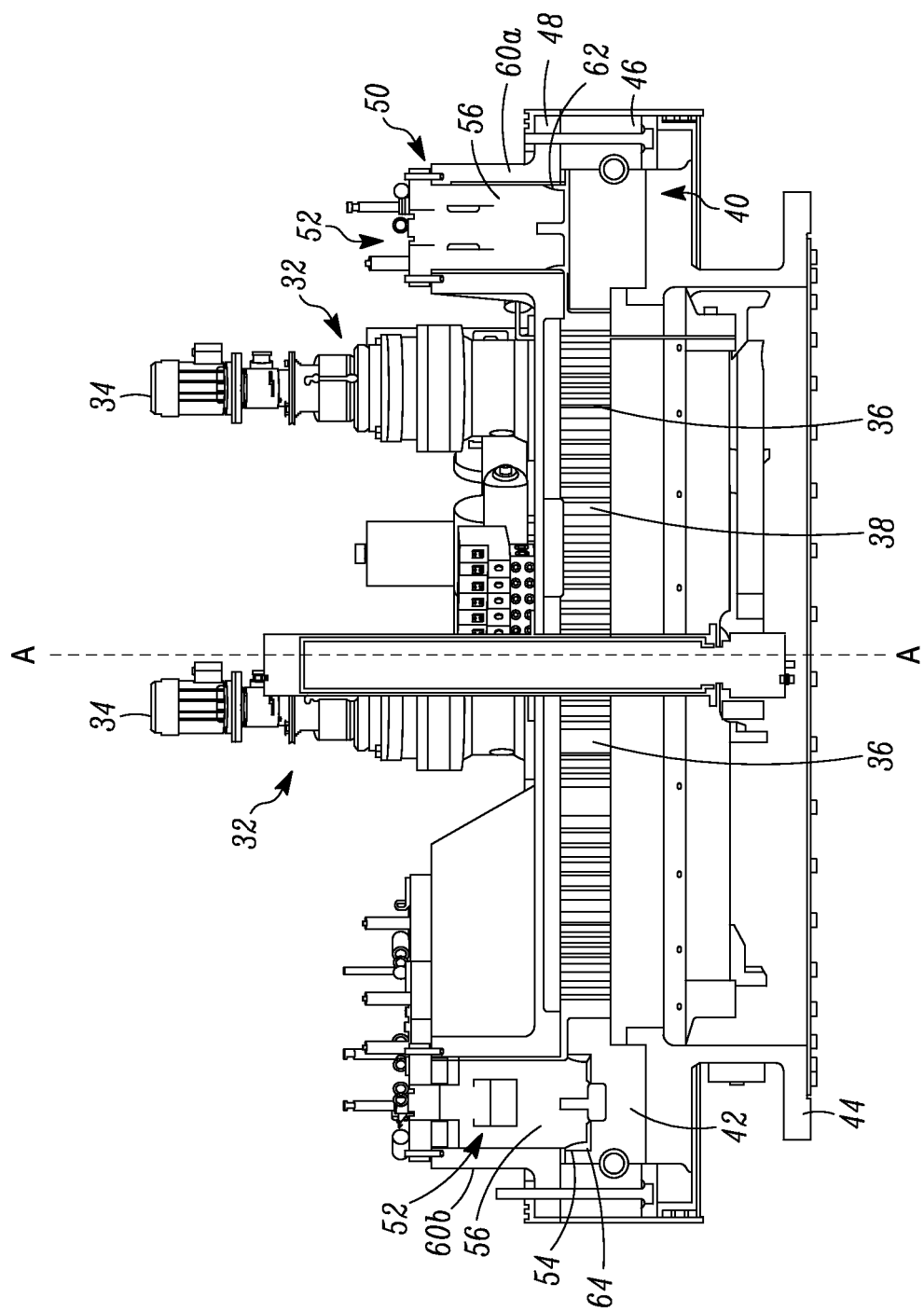
FIG. 4 is a cross-sectional view taken along line 4-4 of FIG. 2.

With reference to FIGS. 2-4, details of the yaw drive mechanism 30 are illustrated. The yaw drive mechanism 30 described herein is an example only and other yaw drive mechanism constructions can be used. FIGS. 2-4 illustrate the region between the nacelle 12 and the tower 14 of the turbine 10. In this example, the yaw drive mechanism 30 includes a plurality of yaw powertrains 32, for example three yaw powertrains 32, each of which includes a drive motor 34 and associated gearing driven by the respective drive motor 34. The powertrains 32 can work together, in any combination thereof, or individually to drive the rotation of the nacelle 12.

As best seen in FIGS. 3 and 4, each powertrain 32 drives a pinion gear 36. The pinion gears 36 are engaged with gear teeth 38 formed on an inner periphery of a slew bearing 40. The slew bearing 40 includes a stationary or fixed inner bearing race 42 that is mounted on a base plate 44 that is fixed to the tower 14 (connection not shown). In this embodiment, the gear teeth 38 can be integrally formed on the inner bearing race 42 so that the gear teeth 38 and the inner bearing race 42 form a unitary or single-piece construction. The slew bearing 40 also includes a rotatable outer bearing race 46 that is rotatable about, and relative to, the inner bearing race 42.

With reference to FIGS. 2 and 4, a rotatable plate 48 is fixed to the top of the outer bearing race 46. The rotatable plate 48 is illustrated as being transparent in FIG. 3 in order to show components underneath the rotatable plate 48. The yaw powertrains 32 are mounted on the rotatable plate 48 with the drive motors 34 on an upper side of the rotatable plate 48 and the pinion gears 36 on the opposite side of the rotatable plate 48. In addition, the rotatable plate 48 is fixed to the nacelle 12.

The yaw drive mechanism 30 operates as follows. One or more of the motors 34 is actuated in order to rotate the respective pinion gear 36. Since the pinion gear(s) 36 is engaged with the teeth 38 of the inner bearing race 42 which is fixed, the plate 48 and the outer bearing race 46, and the nacelle 12 connected thereto, are rotated about the yaw axis A-A.

Once the nacelle 12 is rotated to the correct azimuthal heading, a yaw brake mechanism 50 is used to hold or lock the nacelle 12 at the desired azimuthal heading. In one embodiment, the yaw brake mechanism 50 can include a single rotor lock 52 and a single receptacle 54, both described further below, that cooperate with one another to achieve the locking function. The single rotor lock 52 and the single receptacle 54 can lock the nacelle 12 at a single azimuthal heading. However, it is possible to mount either or both of the single rotor lock 52 and the receptacle 54 in a manner to permit the relative locations of the rotor lock 52 and the receptacle 54 to be selectively altered, in which case the nacelle 12 could be locked at other azimuthal headings depending upon the relative locations of the rotor lock 52 and the receptacle 54.

In another embodiment described in further detail below, the yaw brake mechanism 50 includes a plurality of rotor locks 52 and a plurality of receptacles 54 that cooperate with at least one of the rotor locks 52 to achieve the locking function. One of the rotor locks 52 is actuatable so as to be engageable in one of the receptacles 54 to lock the nacelle 12 at the desired azimuthal heading. One of the rotor locks 52 is engageable with one of the receptacles 54 to achieve locking so that the single rotor lock 52 is capable of countering the full torque of the nacelle 12.

In one embodiment, there are at least two rotor locks 52 and at least two receptacles 54. In another embodiment, the number of the receptacles 54 is greater than the number of the rotor locks 52. In one embodiment described further below, the number of the rotor locks 52 and the receptacles 54 can be selected to allow the nacelle 12 to achieve any azimuth heading around the full 360 degrees about the yaw axis A-A with less than about ±1.0 degree accuracy. For example, in one embodiment, there can be eight of the rotor locks 52 and twenty-five of the receptacles 54 to achieve this full range of azimuth headings and accuracy.

The yaw brake mechanism 50 with multiple rotor locks 52 and multiple receptacles 54 will be described with reference to FIGS. 2-4. The rotor locks 52 are actuatable between an engaged (or first or extended) condition where a portion thereof is disposed in one of the receptacles 54 and a disengaged (or second or retracted) condition where a portion thereof is not disposed in one of the receptacles 54. In the illustrated example, the rotor locks 52 are illustrated as including hydraulic actuated pistons 56 that are actuatable in a direction substantially parallel to the yaw axis A-A. Each rotor lock 52 is actuatable between an engaged (or first or extended) condition where the piston 56 thereof is disposed in one of the receptacles 54 and a disengaged (or second or retracted) condition where the piston 56 thereof is not disposed in one of the receptacles 54. Referring to FIG. 4, the rotor lock 52 on the left side of FIG. 4 is shown as being actuated to the engaged condition where the piston 56 thereof is disposed in one of the receptacles 54, while the rotor lock 52 on the right side of FIG. 4 is shown as being actuated to the disengaged condition where the piston 56 thereof is not disposed in one of the receptacles 54. The rotor locks 52 can have structures other than the pistons 56 that can be selectively disposed within the receptacles 54.

FIG. 2 illustrates the rotor locks 52 as being separated into two groups of rotor locks 52a, 52b. Each group includes a plurality of the rotor locks 52. The rotor locks 52 are mounted in respective raised areas 60a, 60b formed on and projecting upward from the upper surface of the plate 48. However, the rotor locks 52 can be separated into any number of groups, with an equal or unequal number of rotor locks in each group. In addition, in another embodiment, the rotor locks 52 can be arranged in a single group similar to that discussed below with respect to FIGS. 5 and 6.

As shown in FIGS. 3 and 4, the receptacles 54 are formed in an upper surface of the inner bearing race 42 facing the bottom surface of the plate 48. In this embodiment, the receptacles 54 and the inner bearing race 42 are integrally formed with one another forming a unitary or single-piece construction. The inner bearing race 42 forms a lock plate where the receptacles 54 cooperate with the rotor locks 52 for fixing the nacelle 12 in a desired azimuth heading about the yaw axis. In particular, a receptacle 54 can receive the piston 56 of one of the rotor locks 52 therein when the rotor lock 52 is actuated to the engaged condition thereby preventing rotation of the nacelle 12 about the yaw axis and the piston 56 of the rotor lock 52 is removed from the receptacle 54 of the lock plate when the rotor lock 52 is actuated to the disengaged condition thereby permitting rotation of the nacelle 12 about the yaw axis. In an embodiment, the receptacles 54 can be provided in two or more rings or plates that form the inner bearing race 42 or are separate from the inner bearing race 42.

As best seen in FIGS. 3 and 4, the receptacles 54 comprise generally circular indentations formed in the inner bearing race 42 but do not extend through the inner bearing race 42. In another embodiment, the receptacles 54 can extend completely through the inner bearing race 42. The receptacles 54 and the ends of the pistons 56 of the rotor locks 52 to be disposed therein can be shaped to facilitate entry and release of the pistons 56 of the rotor locks 52 into and from the receptacles 54. For example, an end 62 of each piston 56 of the rotor locks 52 can be tapered. In addition, the interior of the receptacles 54 can have a corresponding tapered shape, for example by tapering the side walls of the receptacles 54 or installing a tapered liner 64 in each receptacle 54. In the illustrated embodiment, each receptacle 54 has an axis that is substantially parallel to the yaw axis A-A, and the pistons 56 of the rotor locks 52 are actuatable in a direction that is substantially parallel to the yaw axis A-A. However, in another embodiment, the receptacles 54 and the pistons 56 of the rotor locks 52 can be arranged such that their axes are not parallel to the yaw axis A-A.

As indicated above, a selected one of the pistons 56 of the rotor locks 52 can be actuated to a position where the end 62 of the piston is disposed in one of the receptacles 54 to lock the azimuthal heading of the nacelle 12. By providing multiple rotor locks 52 and multiple receptacles 54, the range of angles at which the nacelle 12 can be locked is increased. For example, in the illustrated embodiment with eight of the rotor locks 52 and twenty-five of the receptacles 54, the nacelle 12 can achieve numerous azimuth headings around the full 360 degrees about the yaw axis A-A with less than about ±1.0 degree accuracy. The following table illustrates angles that are achievable by the nacelle 12 in the illustrated embodiment.

In the table below, the rotor locks 52 are labeled A to H in FIG. 3. In addition, assuming the piston of the rotor lock A in FIG. 3 is engaged in receptacle 1, the remaining receptacles are then labeled consecutively up to 25 in a clockwise direction.

|  |  | ROTOR LOCK | | | | | | | |
|---|---|---|---|---|---|---|---|---|---|
|  |  | A | B | C | D | E | F | G | H |
| RE- | 1 | 0 | 343.8 | 327.6 | 311.4 | 180 | 163.8 | 147.6 | 131.4 |
| CEP- | 2 | 14.4 | 358.2 | 342 | 325.8 | 194.4 | 178.2 | 162 | 145.8 |
| TACLE | 3 | 28.8 | 12.6 | 356.4 | 340.2 | 208.8 | 192.6 | 176.4 | 160.2 |
|  | 4 | 43.2 | 27 | 10.8 | 354.6 | 223.2 | 207 | 190.8 | 174.6 |
|  | 5 | 57.6 | 41.4 | 25.2 | 9 | 237.6 | 221.4 | 205.2 | 189 |
|  | 6 | 72 | 55.8 | 39.6 | 23.4 | 252 | 235.8 | 219.6 | 203.4 |
|  | 7 | 86.4 | 70.2 | 54 | 37.8 | 266.4 | 250.2 | 234 | 217.8 |
|  | 8 | 100.8 | 84.6 | 68.4 | 52.2 | 280.8 | 264.6 | 248.4 | 232.2 |
|  | 9 | 115.2 | 99 | 82.8 | 66.6 | 295.2 | 279 | 262.8 | 246.6 |
|  | 10 | 129.6 | 113.4 | 97.2 | 81 | 309.6 | 293.4 | 277.2 | 261 |
|  | 11 | 144 | 127.8 | 111.6 | 95.4 | 324 | 307.8 | 291.6 | 275.4 |
|  | 12 | 158.4 | 142.2 | 126 | 109.8 | 338.4 | 322.2 | 306 | 289.8 |
|  | 13 | 172.8 | 156.6 | 140.4 | 124.2 | 352.8 | 336.6 | 320.4 | 304.2 |
|  | 14 | 187.2 | 171 | 154.8 | 138.6 | 7.2 | 351 | 334.8 | 318.6 |
|  | 15 | 201.6 | 185.4 | 169.2 | 153 | 21.6 | 5.4 | 349.2 | 333 |
|  | 16 | 216 | 199.8 | 183.6 | 167.4 | 36 | 19.8 | 3.6 | 347.4 |
|  | 17 | 230.4 | 214.2 | 198 | 181.8 | 50.4 | 34.2 | 18 | 1.8 |
|  | 18 | 244.8 | 228.6 | 212.4 | 196.2 | 64.8 | 48.6 | 32.4 | 16.2 |
|  | 19 | 259.2 | 243 | 226.8 | 210.6 | 79.2 | 63 | 46.8 | 30.6 |
|  | 20 | 273.6 | 257.4 | 241.2 | 225 | 93.6 | 77.4 | 61.2 | 45 |
|  | 21 | 288 | 271.8 | 255.6 | 239.4 | 108 | 91.8 | 75.6 | 59.4 |
|  | 22 | 302.4 | 286.2 | 270 | 253.8 | 122.4 | 106.2 | 90 | 73.8 |
|  | 23 | 316.8 | 300.6 | 284.4 | 268.2 | 136.8 | 120.6 | 104.4 | 88.2 |
|  | 24 | 331.2 | 315 | 298.8 | 282.6 | 151.2 | 135 | 118.8 | 102.6 |
|  | 25 | 345.6 | 329.4 | 313.2 | 297 | 165.6 | 149.4 | 133.2 | 117 |

Figure 5:
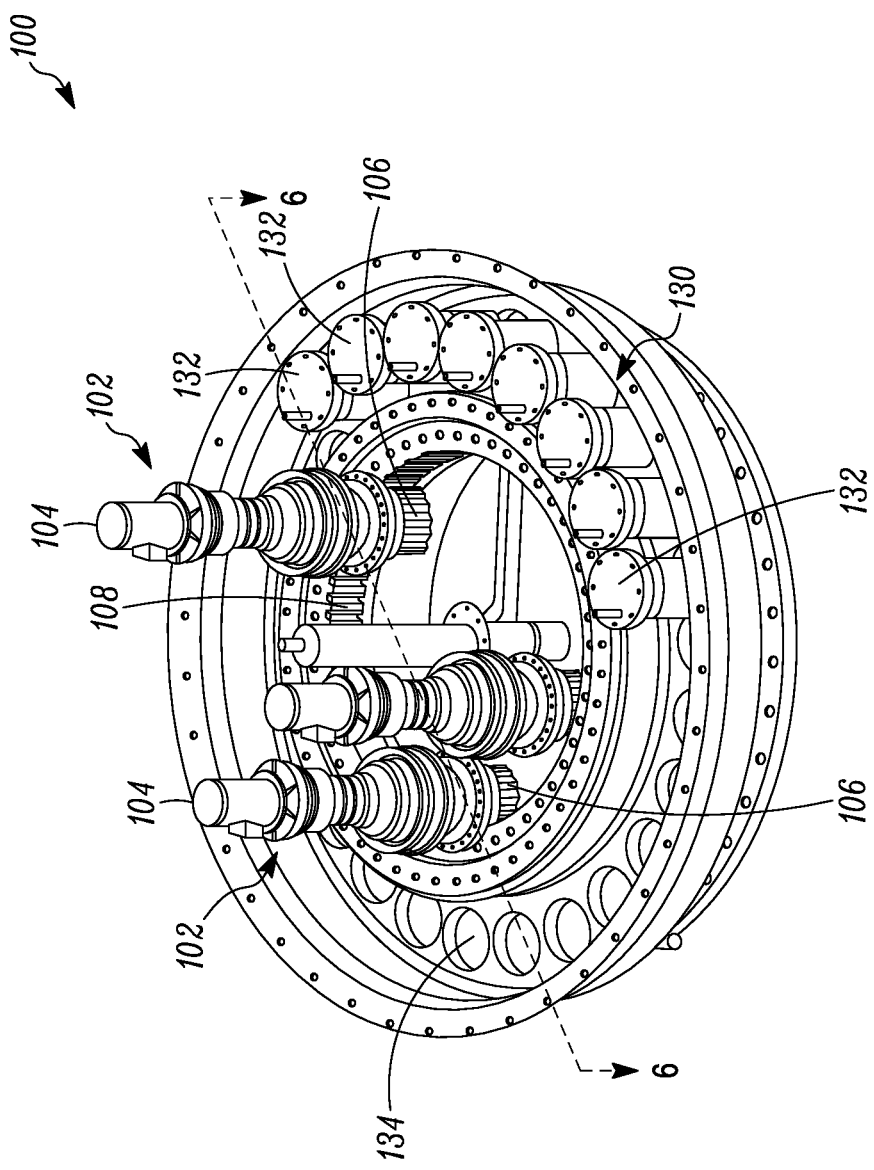
FIG. 5 is an upper perspective view of another embodiment of a yaw drive mechanism and a yaw brake mechanism.
Figure 6:
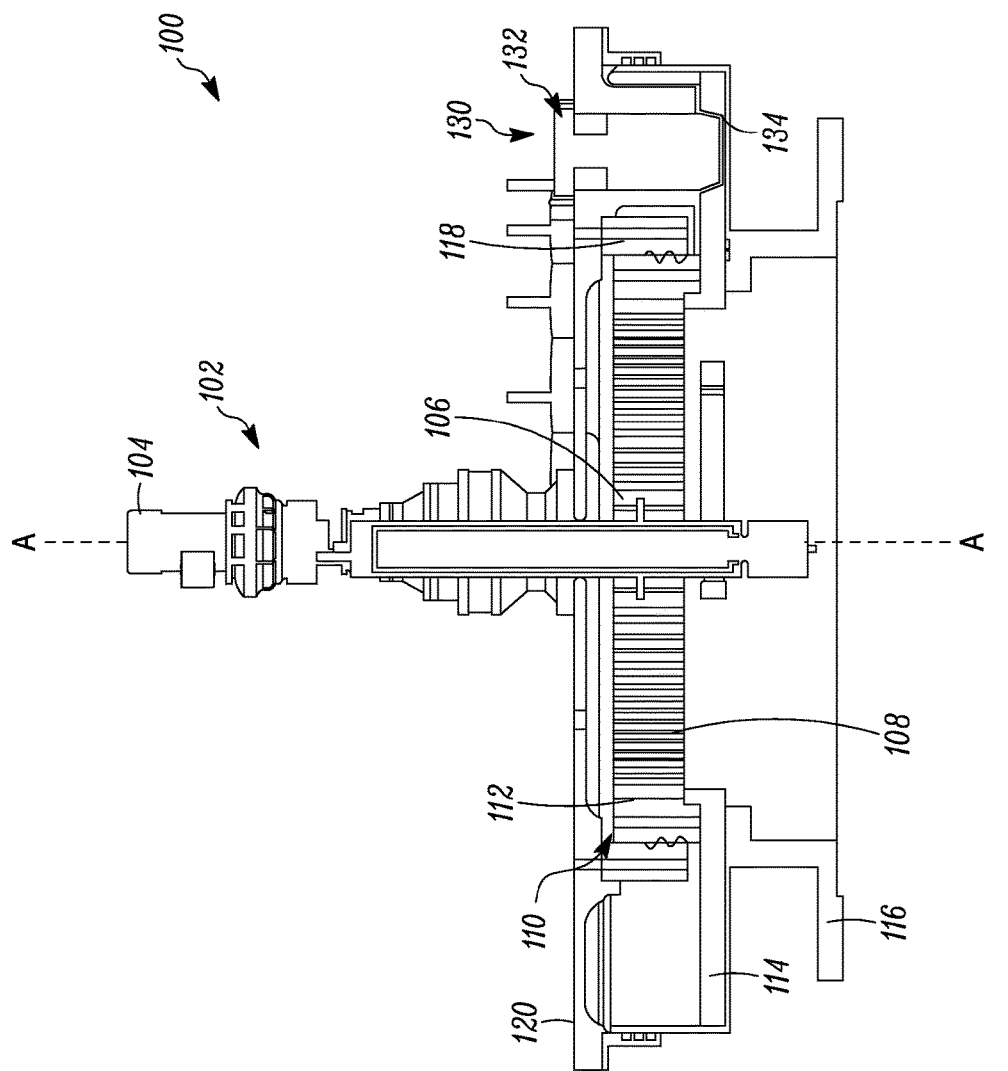
FIG. 6 is a cross-sectional view taken along line 6-6 of FIG. 5.

FIGS. 5 and 6 illustrate another embodiment of a yaw drive mechanism 100. FIGS. 5-6 illustrate the region between the nacelle (not shown) and the tower (not shown) of the turbine which can be similar to the nacelle and tower shown in FIG. 1. The yaw drive mechanism 100 includes a plurality of yaw powertrains 102, for example three yaw powertrains 102, each of which includes a drive motor 104 and associated gearing driven by the respective drive motor 104.

Each powertrain 102 drives a pinion gear 106. The pinion gears 106 are engaged with gear teeth 108 formed on an inner periphery of a slew bearing 110. The slew bearing 110 includes a stationary or fixed inner bearing race 112 that is fixed to a separate lock plate 114 that in turn is fixed to a separate base plate 116 is fixed to the tower of the turbine. The slew bearing 110 also includes a rotatable outer bearing race 118 that is rotatable about, and relative to, the inner bearing race 112.

With reference to FIG. 6, a rotatable plate 120 is fixed to the top of the outer bearing race 118. The plate 120 is made transparent in FIG. 5 in order to show components underneath the plate 120. The yaw powertrains 102 are mounted on the plate 120 with the drive motors 104 on an upper side of the plate 120 and the pinion gears 106 on the opposite side of the plate 120. In addition, the plate 120 is fixed to the nacelle.

The yaw drive mechanism 100 operates as follows. One or more of the motors 104 is actuated in order to rotate the respective pinion gear 106. Since the pinion gear(s) 106 is engaged with the teeth 108 of the inner bearing race 112 which is fixed, the plate 120 and the outer bearing race 118, and the nacelle connected thereto, are rotated about the yaw axis A-A.

With continued reference to FIGS. 5 and 6, once the nacelle is rotated to the correct azimuthal heading, a yaw brake mechanism 130 is used to hold or lock the nacelle at the desired azimuthal heading. In this embodiment, the yaw brake mechanism 130 uses a plurality of rotor locks 132 and a plurality of receptacles 134 that cooperate with the rotor locks 132 to achieve the locking function. The rotor locks 132 and the receptacles 134 are similar in construction and operation to the rotor locks 52 and the receptacles 54 described above whereby the piston of one of the rotor locks 132 is actuatable so as to be engaged in one of the receptacles 134 to lock the nacelle at the desired azimuthal heading. The piston of one of the rotor locks 132 is engageable with one of the receptacles 134 to achieve locking so that the single rotor lock 132 is capable of countering the full torque of the nacelle.

However, in the embodiment illustrated in FIGS. 5 and 6, the receptacles 134 are formed in the lock plate 114 which is separate from, but fastened to, the inner bearing race 112. In addition, the rotor locks 132 are illustrated as being arranged in a single group, sequentially arranged one after the other, instead of being separated into two groups 52a, 52b as described above for the rotor locks 52. However, the rotor locks 132 can be separated into any number of groups, with an equal or unequal number of rotor locks in each group.

As with the rotor locks 52, there are at least two of the rotor locks 132 and at least two of the receptacles 134. In another embodiment, the number of the receptacles 134 is greater than the number of the rotor locks 132. The number of the rotor locks 132 and the receptacles 134 can be selected to allow the nacelle to achieve any azimuth heading around the full 360 degrees about the yaw axis A-A with less than about ±1.0 degree accuracy. For example, in one embodiment, there can be eight rotor locks 132 and twenty-five receptacles 134 to achieve this full range of azimuth headings and accuracy.

FIG. 6 illustrates one of the rotor locks 132 as being actuated to the engaged condition where the piston of the rotor lock 132 is disposed within one of the receptacles 134. The receptacles 134 are formed in an upper surface of the lock plate 114 facing the bottom surface of the plate 120. One of the receptacles 134 can receive the piston of one of the rotor locks 132 therein when the rotor lock 132 is actuated to the engaged condition thereby preventing rotation of the nacelle about the yaw axis and the piston of the rotor lock 132 is removed from the receptacle 134 of the lock plate 114 when the rotor lock 132 is actuated to the disengaged condition thereby permitting rotation of the nacelle about the yaw axis.

With reference to FIGS. 5 and 6, the receptacles 134 comprise generally circular indentations formed in the lock ring 114 but do not extend through the lock ring 114. In another embodiment, the receptacles 134 can extend completely through the lock ring 114. The receptacles 134 and the ends of the pistons of the rotor locks 132 to be disposed therein can be shaped to facilitate entry and release of the pistons of the rotor locks 132 into and from the receptacles 134. For example, similar to the rotor locks 52 and the receptacles 54 described above, an end of each piston of the rotor locks 132 can be tapered. In addition, the interior of the receptacles 134 can have a corresponding tapered shape, for example by tapering the side walls of the receptacles or installing a tapered liner in each receptacle.

Similar to the description above for the rotor locks 52 and the receptacles 54, a selected one of the pistons of the rotor locks 132 can be actuated to an engaged condition where the end of the piston is disposed in one of the receptacles 134 to lock the azimuthal heading of the nacelle. By providing multiple rotor locks 132 and multiple receptacles 134, the range of angles at which the nacelle can be locked is increased. For example, in the illustrated embodiment with eight rotor locks 132 and twenty-five receptacles 134, the nacelle can achieve numerous azimuth headings around the full 360 degrees about the yaw axis A-A with less than about ±1.0 degree accuracy. In particular, the angles listed in the table above can be achieved by the nacelle using the yaw brake mechanism 130.

Figure 7:
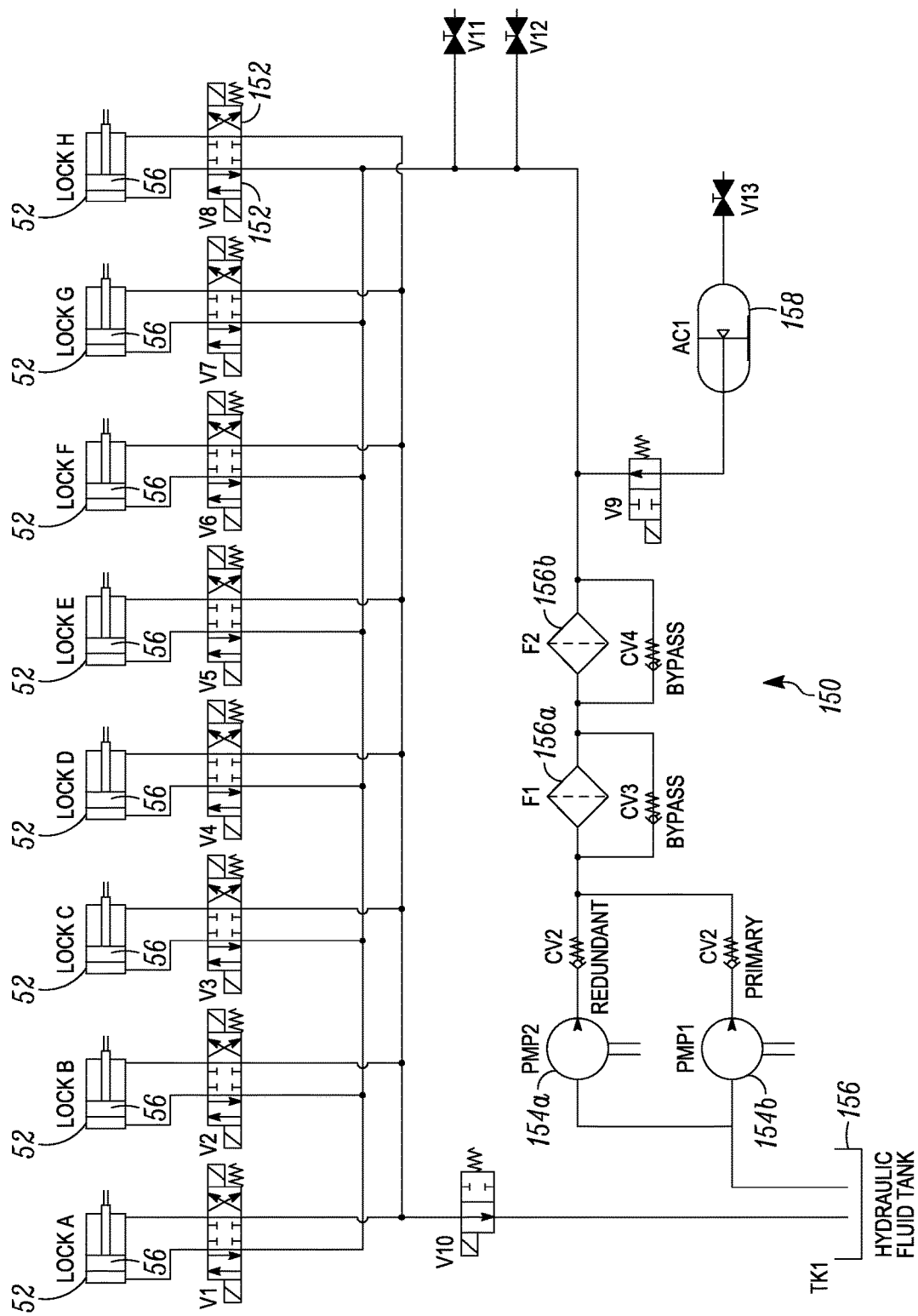
FIG. 7 illustrates a hydraulic system of the yaw brake mechanism for actuating the rotor locks.

Returning to FIGS. 2-4 together with FIG. 7, one example of a hydraulic system 150 for controlling the yaw brake mechanism 50 will now be described. A similar hydraulic system or different system can be used to control the yaw brake mechanism 130 of FIGS. 5-6. In this example, the hydraulic system 150 is illustrated as including solenoid control valves 152, one for each rotor lock 52, that can be mounted on the rotor locks 52 or at any other suitable location for controlling the flow of hydraulic fluid to and from the rotor locks 52 to control the pistons 56. One or more pumps 154a, 154b pump hydraulic fluid from a reservoir 156 through filters 156a, 156b for supplying the pressurized hydraulic fluid, and an accumulator 158 is connected to the hydraulic fluid supply line from the pumps 154a, 154b. As illustrated in FIG. 2, the hydraulic system 150 can be mounted on the plate 48 for rotation with the plate 48. Electrical energy for powering the pumps 154a, 154b, solenoids of the control valves 152 and other electronics can be provided via a slip ring mechanism 160.

The construction of the hydraulic system 150 illustrated in FIGS. 2-4 and 7 is an example and many other constructions are possible. In addition, in some embodiments, the rotor locks 52 may be pneumatically or electrically actuated instead of being hydraulically actuated.

The examples disclosed in this application are to be considered in all respects as illustrative and not limitative. The scope of the invention is indicated by the appended claims rather than by the foregoing description; and all changes which come within the meaning and range of equivalency of the claims are intended to be embraced therein.

The invention claimed is:

1. A yaw brake mechanism of a yawing structure, the yawing structure rotatably mounted on a non-rotatable structure and rotatable about a yaw axis of the non-rotatable structure, comprising:
    at least one rotor lock that is actuatable between an engaged condition and a disengaged condition and actuation of the rotor lock is electrically controllable;
    a lock plate rotates relative to the at least one rotor lock about the yaw axis and that cooperates with the at least one rotor lock for fixing the yawing structure in a desired orientation about the yaw axis;
    the lock plate includes at least one receptacle that can receive a portion of the at least one rotor lock therein when the at least one rotor lock is actuated to the engaged condition; and the lock plate and the at least one rotor lock are positioned relative to each other whereby the portion of the at least one rotor lock is disposed within the at least one receptacle of the lock plate when the at least one rotor lock is actuated to the engaged condition thereby preventing rotation of the yawing structure about the yaw axis and the at least one rotor lock is removed from the at least one receptacle of the lock plate when the at least one rotor lock is actuated to the disengaged condition thereby permitting rotation of the yawing structure about the yaw axis and permitting rotation of the lock plate relative to the at least one rotor lock about the yaw axis.

2. The yaw brake mechanism of claim 1, comprising a plurality of the rotor locks and a plurality of the receptacles.

3. The yaw brake mechanism of claim 2, wherein the lock plate has a central axis that is substantially parallel to the yaw axis, and the receptacles are formed at circumferentially spaced locations around the central axis of the lock plate.

4. The yaw brake mechanism of claim 3, wherein the receptacles are disposed around the entire circumference of the lock plate.

5. The yaw brake mechanism of claim 3, wherein the lock plate includes an inner perimeter that is formed with gear teeth, and the lock plate forms an inner race of a slew bearing.

6. The yaw brake mechanism of claim 2, wherein the number of the receptacles is greater than the number of the rotor locks.

7. The yaw brake mechanism of claim 2, wherein the rotor locks and the receptacles permit the yawing structure to achieve any yawing angle between 0 to 360 degrees in multiples of a predetermined amount of degrees.

8. The yaw brake mechanism of claim 1, wherein the at least one rotor lock is mounted to one of the yawing structure or the non-rotatable structure, and the lock plate is mounted to the other of the yawing structure or the non-rotatable structure.

9. The yaw brake mechanism of claim 1, wherein the at least one rotor lock is hydraulically, pneumatically, or electrically actuatable.

10. The yaw brake mechanism of claim 1, wherein the at least one rotor lock comprises a piston.

11. The yaw brake mechanism of claim 10, wherein the piston is actuatable in a direction substantially parallel to the yaw axis.

12. A fluid turbine, comprising:
    a tower having a yaw axis;
    a nacelle rotatably mounted on the tower and rotatable about the yaw axis to change an orientation of the nacelle about the yaw axis;
    a rotor rotatably mounted on the nacelle for rotation about a rotation axis;
    a yaw drive mechanism connected to the nacelle for rotating the nacelle about the yaw axis; and
    a yaw brake mechanism for fixing the orientation of the nacelle about the yaw axis, the yaw brake mechanism including:
        at least one rotor lock mounted to either the nacelle or the tower that is actuatable between an engaged condition and a disengaged condition and actuation of a piston is electrically controllable;
        a lock plate that rotates relative to the at least one rotor lock about the yaw axis and cooperates with the at least one rotor lock for fixing the nacelle in a desired orientation about the yaw axis, the lock plate is mounted to either the tower or the nacelle;

the lock plate includes at least one receptacle that can receive a portion of the at least one rotor lock therein when the at least one rotor lock is actuated to the engaged condition; and the lock plate and the at least one rotor lock are positioned relative to each other whereby the portion of the at least one rotor lock is disposed within the at least one receptacle of the lock plate when the at least one rotor lock is actuated to the engaged condition thereby preventing rotation of the nacelle about the yaw axis and the at least one rotor lock is removed from the at least one receptacle of the lock plate when the at least one rotor lock is actuated to the disengaged condition thereby permitting rotation of the nacelle about the yaw axis and permitting rotation of the lock plate relative to the at least one rotor lock about the yaw axis.

13. The fluid turbine of claim 12, comprising a plurality of the rotor locks and a plurality of the receptacles.

14. The fluid turbine of claim 13, wherein the lock plate has a central axis that is substantially parallel to the yaw axis, and the receptacles are formed at circumferentially spaced locations around the central axis of the lock plate.

15. The fluid turbine of claim 14, wherein the receptacles are disposed around the entire circumference of the lock plate.

16. The fluid turbine of claim 13, comprising more than two of the rotor locks and more than two of the receptacles.

17. The fluid turbine of claim 13, wherein the number of the receptacles is greater than the number of the rotor locks.

18. The fluid turbine of claim 12, wherein the lock plate includes an inner perimeter that is formed with gear teeth, and the lock plate forms an inner race of a slew bearing.

19. The fluid turbine of claim 13, wherein the rotor locks and the receptacles permit the nacelle to achieve any yawing angle between 0 to 360 degrees in multiples of a predetermined amount of degrees.

20. The fluid turbine of claim 12, wherein the fluid turbine comprises a tidal turbine, a water turbine or a wind turbine.

21. A fluid turbine, comprising:
a tower having a yaw axis;
a nacelle rotatably mounted on the tower and rotatable about the yaw axis to change an orientation of the nacelle about the yaw axis;
a rotor rotatably mounted on the nacelle for rotation about a rotation axis;
a yaw drive mechanism connected to the nacelle for rotating the nacelle about the yaw axis; and
a yaw brake mechanism for fixing the orientation of the nacelle about the yaw axis, the yaw brake mechanism including:
at least one rotor lock mounted to either the nacelle or the tower that is actuatable between an engaged condition and a disengaged condition;
a lock plate that cooperates with the at least one rotor lock for fixing the nacelle in a desired orientation about the yaw axis, the lock plate is mounted to either the tower or the nacelle, the lock plate includes an inner perimeter that is formed with gear teeth, and the lock plate forms an inner race of a slew bearing;
the lock plate includes at least one receptacle that can receive a portion of the at least one rotor lock therein when the at least one rotor lock is actuated to the engaged condition; and
the lock plate and the at least one rotor lock are positioned relative to each other whereby the portion of the at least one rotor lock is disposed within the at least one receptacle of the lock plate when the at least one rotor lock is actuated to the engaged condition thereby preventing rotation of the nacelle about the yaw axis and the portion of the at least one rotor lock is removed from the at least one receptacle of the lock plate when the at least one rotor lock is actuated to the disengaged condition thereby permitting rotation of the nacelle about the yaw axis.

* * * * *